March 11, 1930. A. MODAVE 1,749,920
APPARATUS FOR REMOVING DUST FROM GASES
Filed Sept. 8, 1927 2 Sheets-Sheet 1

Inventor:
André Modave
by Victor D. Borst
Atty.

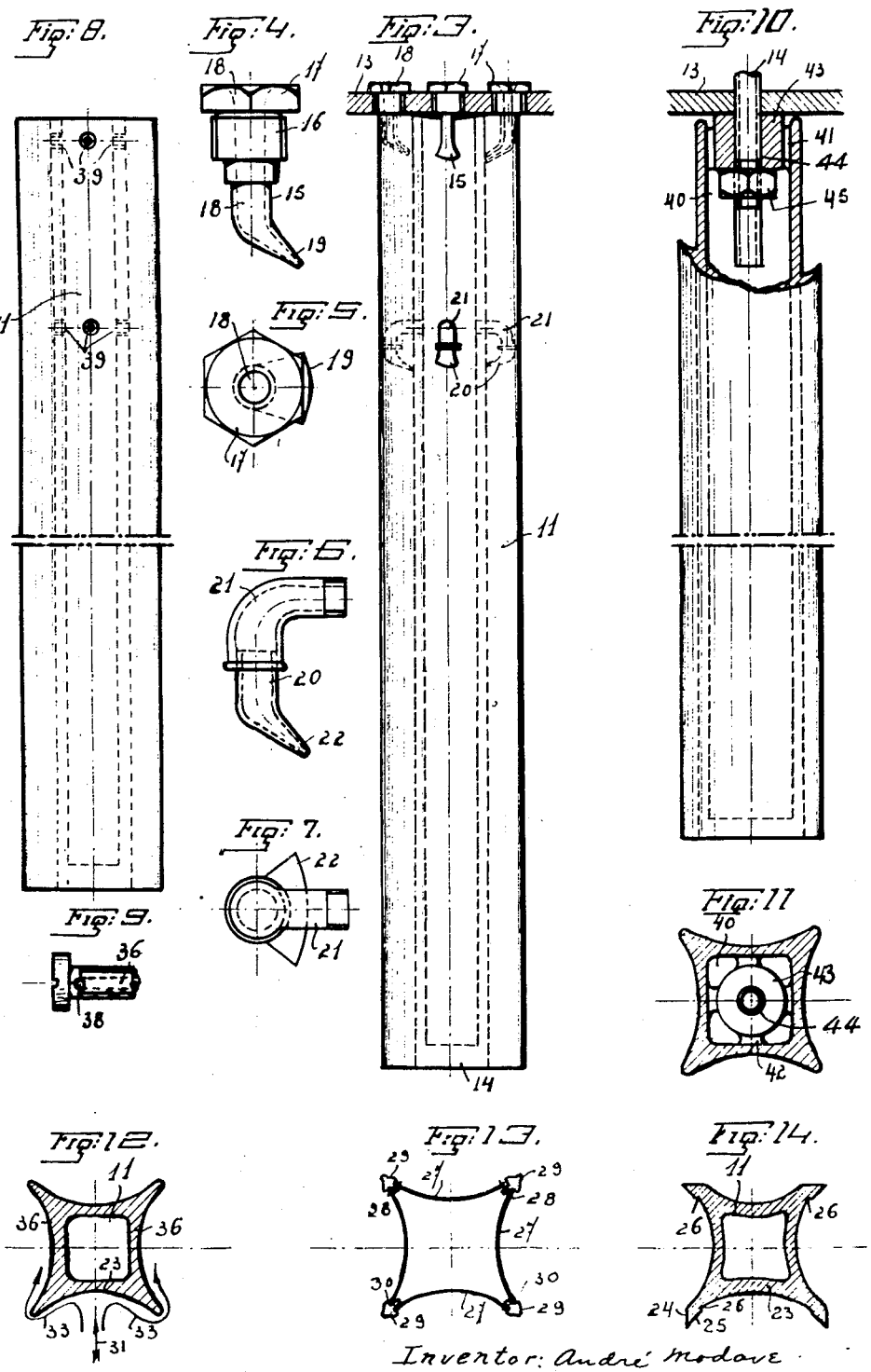

Patented Mar. 11, 1930

1,749,920

UNITED STATES PATENT OFFICE

ANDRÉ MODAVE, OF BRUSSELS, BELGIUM, ASSIGNOR OF FIFTY PER CENT TO ATELIERS HANREZ SOCIETE ANONYME, OF MONCEAU SUR SAMBRE, BELGIUM, A COMPANY

APPARATUS FOR REMOVING DUST FROM GASES

Application filed September 8, 1927, Serial No. 218,191, and in Belgium September 13, 1926.

This invention relates to an apparatus for removing dust from gases in general. It has for its object to effect the removal of the dust in suspension in such gases, for example in smoke, by particularly simple means, avoiding the production of a sensible resistance to the passage of the gases whilst preserving all the properties thereof, that is to say without moistening them.

With this object in view the invention consists in the special arrangements and combinations of parts hereinafter fully described and pointed out in the appended claims. On the drawings—

Figure 1 shows a longitudinal section of the apparatus and

Figure 2 a plan view thereof.

Figure 3 is a detached view to a larger scale in front elevation, of one of the hollow elements furnished with pipes for the flow of the liquid to the concave faces acting as separating walls for the dust.

Figure 4 is a side elevation of one of the upper nozzles, and

Figure 5 is a plan thereof.

Figure 6 is a side elevation of a nozzle fed from the interior of the hollow element.

Figure 7 is a plan of this nozzle.

Figure 8 is an elevation of another form of construction of an element provided with moistening nozzles.

Figure 9 is a detached view of a nozzle employed in combination with this element.

Figure 10 is a view, partly in section and partly in elevation, of another construction of similar element.

Figure 11 shows a plan thereof in section.

Figures 12, 13 and 14 show three transverse sections of hollow elements.

Figure 1:
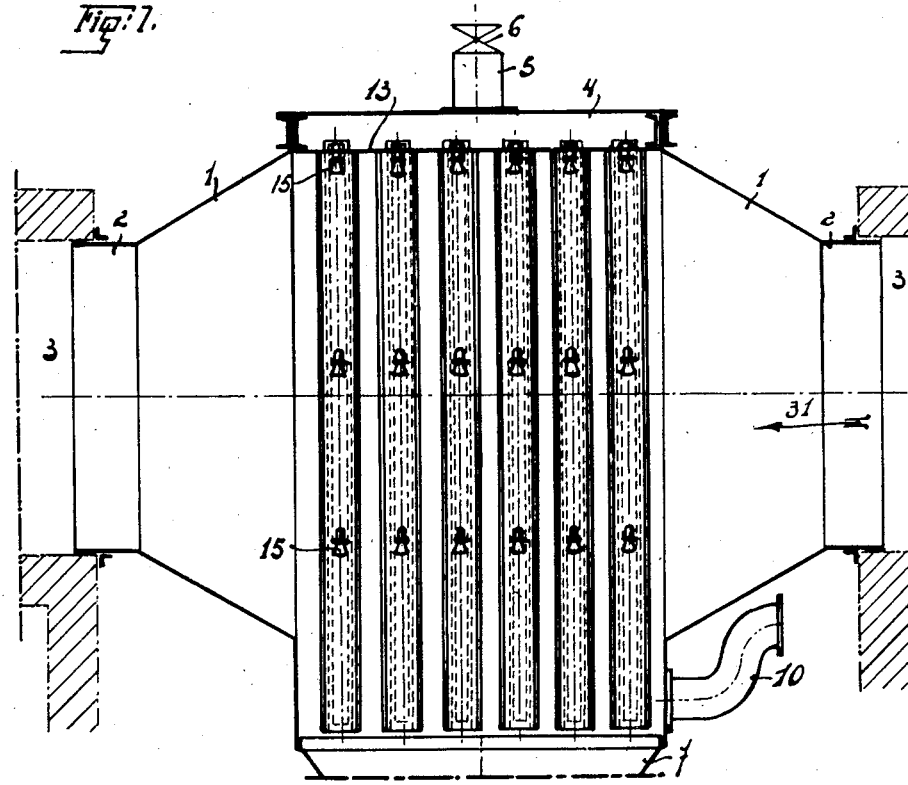
Figure 2:
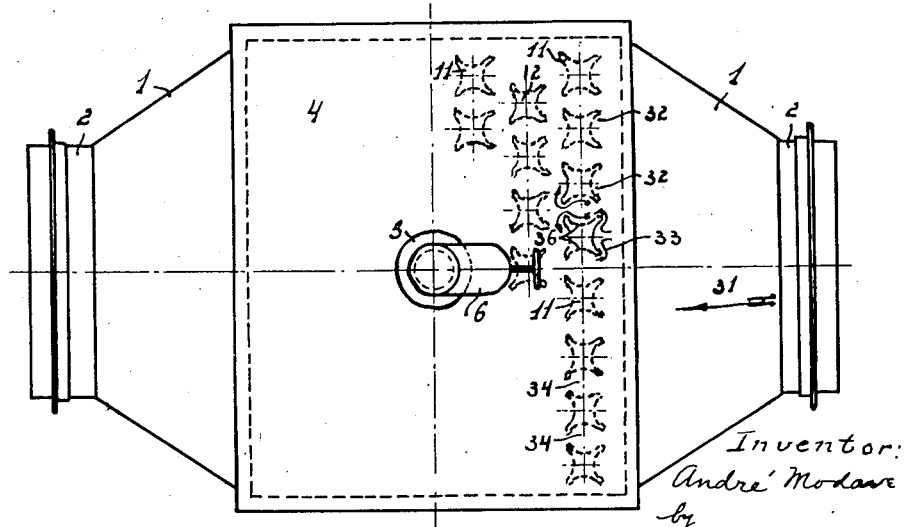

The apparatus shown in Figures 1 and 2 comprises a chamber 1, made of sheet iron, for example, connected up, by means of the junctions 2, in the pipes or passages 3 in which the gases to be dedusted circulate. The chamber 1 is provided, at its upper part, with a chamber 4 for the entrance of the water, said chamber 4 is furnished with a pipe 5 provided with a closing valve 6. It forms at its lower part a conical chamber 7 serving to collect dust and which is furnished with an exit opening 8 regulated by a valve 9. A pipe 10 serves as an overflow to assume the maintenance in the chamber 1 of a fixed level of liquid. In the chamber 1 are suspended several hollow pieces or baffles 11 disposed, as Figure 2 shows, in successive rows, the elements of one row being displaced or staggered with reference to those of neighbouring rows in such a manner as to present their transverse axis 12 to the centre of the space composed between two adjacent elements of neighbouring rows. The hollow elements 11 are suspended from the lower plate 13 of the water inlet chamber 4 and are secured in holes in this plate with the aid of hollow cylindrical extensions, held by a nut. Each hollow element 11 is closed at its lower part, as is shown in Figure 3 by a bottom 14.

In the bottom plate 13 of the chamber 4 nozzles 15 are arranged, shewn detached in Figures 4 and 5. These nozzles which are held in the plate 13 by a screw thread 16 and a nut 17, are provided with a passage 18 terminating in a flattened nozzle 19 ensuring the flow of the moistening liquid contained in the chamber 4, over the faces of the element 11. When, as is generally the case in practice, these elements 11 are relatively fairly large, supplementary inlets for the moistening liquid may be formed by nozzles 20 secured in the wall of the element 11 by curved connections 21. The nozzles 20 are supplied with water through the hollow baffle elements. These nozzles 20 each have a flattened jet outlet 22, thus insuring the distribution of the liquid over the faces of the element. Each element has, as shown in Figures 12 to 14, four concave faces 23, along which the moistening liquid flows. These concave faces may be connected as shown in Figure 12, or be provided, at the extremities of the wings 24 (Figure 14) with projections 25 forming grooves 26 designed to retain the dust. These grooves may be disposed at each extremity of the wings 24 receiving the direct action of the gas to be treated and at the extremity of one of the wings, along which the gaseous streams flow after having flowed over the face subject to the direct action of the gaseous current.

The hollow elements 11 may be made in castings, as shown in Figures 12 and 14, or be formed of curved plates 27 (Figure 13) assembled at their extremities by rivets 28 traversing the profiled ribs 29 also forming the grooves for retaining the dust.

The apparatus functions in the following manner:

The gaseous current, arriving, for example, in the direction of the arrow 31 (Figures 1, 2 and 13) meets the concave faces 32 of the elements forming part of the first row. This gaseous current is divided in consequence, by contact with each element, into two gaseous streams 33 which pass the angles of the elements 11 in order to penetrate into the space 34 formed between two adjacent elements. After having traversed this space, the gaseous streams enter the space 34 (Figure 2) formed by two opposite curved surfaces and undergo, in consequence, a kind of expansion which favours the contact of the dust with the lateral faces 36 of the elements. At the exit from this space, formed between two adjacent elements, the gaseous currents are again contracted and undergo a fresh expansion in the space formed between the elements of the first row and those of the second row. By contact with the faces 32 of the elements of the second row, the gaseous currents are again divided and continue their course whilst undergoing successive contractions and expansions. The total section of the free passages between the elements being equal to the total section of flow of the pipes 3, the flow of the gas is effected without undue resistance.

At each meeting with a concave face of one of the elements the gaseous current deposits a portion of the dust which is retained by the layer of liquid flowing from the chamber 4 by the nozzles 19 and 22. It follows that the dust is retained by this liquid layer and tends to be carried along by it towards the extremities of the wings 24. In the case where use is made of the form of elements 11, shown in Figure 14, the dust is retained on the front face by the grooves 26 and is conveyed downwards with the moistening liquid into the collector chamber 7. The gaseous currents, which have passed the extremities of the wings 24, then undergo a similar treatment between the lateral faces of each of the hollow elements, whereby the dust in suspension is eliminated. The cleaned current is finally removed from the chamber 1 by the pipe 3 arranged at the extremity of the exit of the apparatus. Normally, the level of the moistening liquid in the chamber 1, and in the dust collector 7, is regulated by the overflow pipe 10 in such a manner as to avoid the direct passage of the gases under the extremities of the elements 11.

The invention is obviously not limited to the forms of embodiment above described. For example, the nozzles for the introduction of the moistening liquid may vary according to the use or the desired construction. Figures 8 and 9 show for example, a modification in which the nozzles are formed of simple hollow screws 36 provided with a central conduit 37 and two or more lateral orifices 38. These nozzles 36 are secured in the holes 39 formed in the faces of the element 11 in such a manner as to distribute, by the openings 38, the liquid contained in the hollow elements 11.

Figures 10 and 11 show another constructional modification in which the feeding is made simply by the interior of the hollow element. To this end, the former is provided in its interior with a passage 40 which is open at its upper part through the pipes 41 formed between the ribs 42 maintaining a central element 43 by the aid of which the hollow element is applied against the lower plate 13 of the chamber 4. In this case, the junctions 43 give free passage to a hollow bolt 44 held by a nut 45 and the liquid contained in the chamber 4 flows through the hollow screw 44 into the cavity of the element 11 from which it flows back through the passages 41 for the purpose of flowing along the curved faces of the element.

Whatever may be the method of mounting the hollow element and the disposition of the nozzles for introducing the water or of the moistening liquid, the removal of dust is carried out in virtue of the curved faces of the elements and to their quincuncial disposition in the chamber 1 of the apparatus.

What I claim is:

1. In an apparatus for removing dust from gases a chamber having an inlet and outlet thereto, baffle elements having concave outer surfaces arranged in said chamber between said inlet and outlet in successive rows, said elements of one row being staggered with respect to those of the adjacent rows and being arranged to provide narrow restricted passages between the edges of said elements and relatively wider passages between the surfaces of said elements, and means for distributing water over the outer surfaces of said elements.

2. In an apparatus for removing dust from gases a chamber having an inlet and outlet thereto, hollow baffle elements having concave outer surfaces arranged in said chamber between said inlet and outlet in successive rows, said elements of one row being staggered with respect to those of the adjacent rows and being arranged to provide narrow restricted passages between the edges of said elements and relatively wider passages between the surfaces of said elements, and means for distributing water over the inner and outer surfaces of said baffle elements.

3. An apparatus for removing dust from gases a chamber having an inlet and outlet thereto, baffle elements having concave and ribbed outer surfaces arranged in said chamber between said inlet and outlet in successive rows, said elements of one row being staggered with respect to those of the adjacent rows and being arranged to provide narrow restricted passages between the edges of said elements and relatively wider passages between the surfaces of said elements.

4. In an apparatus for removing dust from gases a dust collecting chamber, a second chamber disposed above said dust collecting chamber, means for supplying water to said second chamber, rows of baffle elements disposed in said dust collecting chamber in staggered relation, said baffle elements being formed of curved plates, having ribs therein and means for distributing water over the curved surfaces of said elements.

In testimony whereof I have affixed my signature.

ANDRÉ MODAVE.